United States Patent
Sasaki

(10) Patent No.: US 11,245,137 B2
(45) Date of Patent: Feb. 8, 2022

(54) CONTROL APPARATUS, CONTROL METHOD, AND PROGRAM

(71) Applicant: Envision AESC Energy Devices Ltd., Sagamihara (JP)

(72) Inventor: Hideaki Sasaki, Sagamihara (JP)

(73) Assignee: ENVISION AESC JAPAN LTD., Kanagawa (JP)

(*) Notice: Subject to any disclaimer, the term of this patent is extended or adjusted under 35 U.S.C. 154(b) by 321 days.

(21) Appl. No.: 16/347,879

(22) PCT Filed: Oct. 30, 2017

(86) PCT No.: PCT/JP2017/039105
§ 371 (c)(1),
(2) Date: May 7, 2019

(87) PCT Pub. No.: WO2018/088260
PCT Pub. Date: May 17, 2018

(65) Prior Publication Data
US 2019/0312316 A1 Oct. 10, 2019

(30) Foreign Application Priority Data
Nov. 10, 2016 (JP) .............................. JP2016-219447

(51) Int. Cl.
*H02J 7/00* (2006.01)
*H01M 10/44* (2006.01)
(Continued)

(52) U.S. Cl.
CPC ..... *H01M 10/448* (2013.01); *H01M 10/4285* (2013.01); *H01M 10/44* (2013.01); *H01M 10/48* (2013.01)

(58) Field of Classification Search
None
See application file for complete search history.

(56) References Cited

U.S. PATENT DOCUMENTS

| 2010/0259219 A1 | 10/2010 | Kurimoto et al. |
| 2012/0306450 A1* | 12/2012 | Nakayama ........... G01R 31/367 320/134 |
| 2013/0162206 A1* | 6/2013 | Takeuchi ............... H02J 50/12 320/108 |

FOREIGN PATENT DOCUMENTS

| EP | 2 230 124 A1 | 9/2010 |
| JP | 2005-071697 A | 3/2005 |

(Continued)

OTHER PUBLICATIONS

N. Legrand et al., "Physical characterization of the charging process of a Li-ion battery and predication of Li plating by electrochemical modelling," Journal of Power Sources, 2014, pp. 208-216, vol. 245.

(Continued)

*Primary Examiner* — Arun C Williams
(74) *Attorney, Agent, or Firm* — Sughrue Mion, PLLC

(57) ABSTRACT

A control apparatus (2000) includes a control unit (2020). The control unit (2020) causes a charging apparatus (20) to perform charging of a lithium ion secondary battery (10), by controlling the charging apparatus (20). First, the control unit (2020) causes the charging apparatus (20) to perform the charging of the lithium ion secondary battery (10), until a voltage of the lithium ion secondary battery (10) becomes a predetermined voltage. Thereafter, the control unit (2020) causes the charging apparatus (2) to suspend the charging of the lithium ion secondary battery (10), until a predetermined time elapses. Therefore, the control unit (2020) causes the charging apparatus (20) to further perform the charging of the lithium ion secondary battery (10), after the suspending. The predetermined time is a time t [minute] that satisfies "$t \geq -A+B*x+C*y$." $x[g/cm^2]$ represents weight per unit area of a negative electrode of the lithium ion secondary battery (10). $y [g/cm^3]$ is density of the negative electrode. A is a constant that is equal to or more than 50 and equal to or less (Continued)

than 70. B is a constant that is equal to or more than 500 and equal to or less than 620. C is a constant that is equal to or more than 30 and equal to or less than 36.

5 Claims, 7 Drawing Sheets

(51) Int. Cl.
  *H01M 10/42* (2006.01)
  *H01M 10/48* (2006.01)

(56) References Cited

FOREIGN PATENT DOCUMENTS

| | | |
|---|---|---|
| JP | 2012-016109 A | 1/2012 |
| JP | 2015-104139 A | 6/2015 |
| WO | 2009/090913 A1 | 7/2009 |

OTHER PUBLICATIONS

International Search Report of PCT/JP2017/039105 dated Jan. 16, 2018.
Communication dated Aug. 18, 2020 by the Japanese Patent Office in application No. 2018-550146.
Communication dated Feb. 28, 2020 from European Patent Office in EP Application No. 17869307.3.

\* cited by examiner

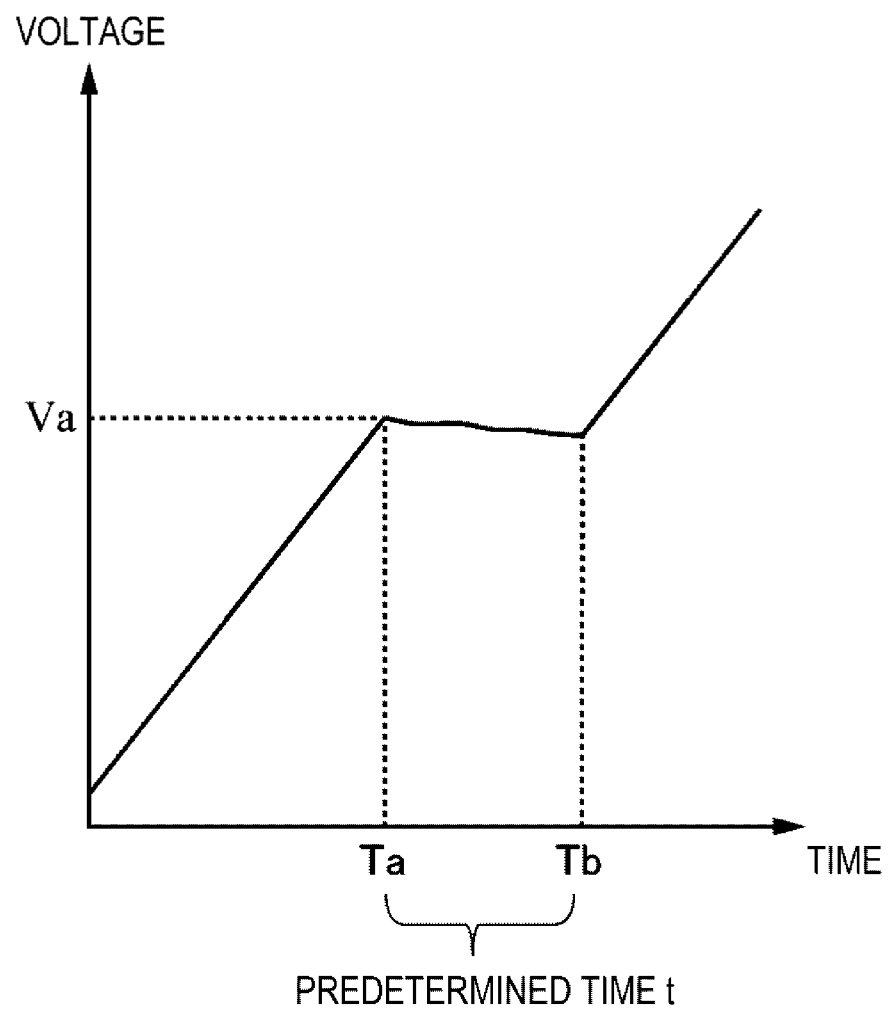

CONTROL APPARATUS, CONTROL METHOD, AND PROGRAM

CROSS REFERENCE TO RELATED APPLICATIONS

This application is a National Stage of International Application No. PCT/JP2017/039105 filed Oct. 30, 2017, claiming priority based on Japanese Patent Application No. 2016-219447 filed Nov. 10, 2016, the contents of which are incorporated herein by reference.

TECHNICAL FIELD

The present invention relates to charging of a secondary battery.

BACKGROUND ART

As one of secondary batteries, a lithium ion secondary battery is used. When the lithium ion secondary battery is used, there is a need to charge the lithium ion secondary battery using a charging apparatus.

For example, there are Patent Document 1 to Patent Document 3, as a technology relating to the charging of the secondary battery. Patent Document 1 disclosed a technology of measuring a terminal voltage of a secondary battery at each suspension time in an intermittent charging operation, computing a parameter which represents a charged state of the secondary battery from the measured terminal voltage, and lowering a charging electrical current based on the parameter.

Patent Document 2 disclosed a technology of determining when to start charging of a lithium ion secondary battery, based on a change ratio of an open circuit voltage (OCV) of the lithium ion secondary battery, after discharging of the lithium ion secondary battery.

Patent Document 3 discloses a technology of performing improvement of a charging cycle, by providing suspension in charging when the charging of a nonaqueous electrolyte secondary battery is first performed.

RELATED DOCUMENT

Patent Document

[Patent Document 1] Japanese Patent Application Publication No. 2015-104139

[Patent Document 2] Japanese Patent Application Publication No. 2012-016109

[Patent Document 3] Japanese Patent Application Publication No. 2005-071697

SUMMARY OF THE INVENTION

Technical Problem

The present inventors find out a new charging method of a lithium ion battery. An object of the present invention is to provide the new charging method of the lithium ion battery.

Solution to Problem

A first control apparatus of the present invention includes a control unit that controls a charging apparatus which performs charging of a lithium ion secondary battery.

The control unit (1) causes the charging apparatus to perform the charging of the lithium ion secondary battery, until a voltage of the lithium ion secondary battery becomes a predetermined voltage, (2) causes the charging apparatus to suspend the charging of the lithium ion secondary battery, until a predetermined time t elapses, after the charging, and (3) causes the charging apparatus to further perform the charging of the lithium ion secondary battery, after the suspending.

The predetermined time t [minute] satisfies a condition that is determined by Expression (1) using weight per unit area $x[g/cm^2]$ of a negative electrode of the lithium ion secondary battery and density $y[g/cm^3]$ of the negative electrode.

Expression 1

$$t \geq -A + B^*x + C^*y\ 50 \leq A \leq 70, 500 \leq B \leq 620, 30 \leq C \leq 36 \qquad (1)$$

A second control apparatus of the present invention includes a control unit that controls a charging apparatus which performs charging of a lithium ion secondary battery.

The control unit (1) causes the charging apparatus to perform the charging of the lithium ion secondary battery, until a voltage of the lithium ion secondary battery becomes a predetermined voltage, (2) causes the charging apparatus to suspend the charging of the lithium ion secondary battery, until a predetermined time t elapses, after the charging, and (3) causes the charging apparatus to further perform the charging of the lithium ion secondary battery, after the suspending.

The predetermined time is a length that is equal to or more than time from a time point at which the suspending is started to a time point at which a temporal change ratio of the voltage of the lithium ion secondary battery becomes a local minimum value.

A first control method of the present invention includes (1) a step of causing a charging apparatus that performs charging of a lithium ion secondary battery to perform the charging of the lithium ion secondary battery, until a voltage of the lithium ion secondary battery becomes a predetermined voltage, (2) a step of causing the charging apparatus to suspend the charging of the lithium ion secondary battery, until a predetermined time t elapses, after the charging, and (3) a step of causing the charging apparatus to further perform the charging of the lithium ion secondary battery, after the suspending.

The predetermined time t [minute] satisfies a condition that is determined by Expression (2) using weight per unit area $x[g/cm^2]$ of a negative electrode of the lithium ion secondary battery and density $y\ [g/cm^3]$ of the negative electrode.

Expression 3

$$t \geq -A + B^*x + C^*y\ 50 \leq A \leq 70, 500 \leq B \leq 620, 30 \leq C \leq 36 \qquad (2)$$

A second control method of the present invention includes (1) a step of causing a charging apparatus that performs charging of a lithium ion secondary battery to perform the charging of the lithium ion secondary battery, until a voltage of the lithium ion secondary battery becomes a predetermined voltage, (2) a step of causing the charging apparatus to suspend the charging of the lithium ion secondary battery, until a predetermined time t elapses, after the charging, and (3) a step of causing the charging apparatus to further perform the charging of the lithium ion secondary battery, after the suspending.

The predetermined time is a length that is equal to or more than time from a time point at which the suspending is started to a time point at which a temporal change ratio of the voltage of the lithium ion secondary battery becomes a local minimum value.

A program of the present invention causes a computer to execute each step of the first control method or the second control method of the present invention.

Advantageous Effects of Invention

According to the present invention, a new charging method of a lithium ion battery is provided.

BRIEF DESCRIPTION OF THE DRAWINGS

The object described above, other objects, features, and advantages will be further clear by suitable example embodiments described hereinafter, and accompanying drawings.

FIG. 2 is a diagram illustrating a transition of a voltage, regarding a lithium ion secondary battery charged by a charging apparatus that is controlled by the control apparatus.

DESCRIPTION OF EMBODIMENTS

Hereinafter, example embodiments of the present invention will be described with reference to drawings. In all of the drawings, the same marks are attached to the same components, and the description thereof will not be repeated. Except for a case of being particularly described, each block in a block diagram is not a configuration of a hardware unit but a configuration of a functional unit.

Example Embodiment 1

Figure 1:
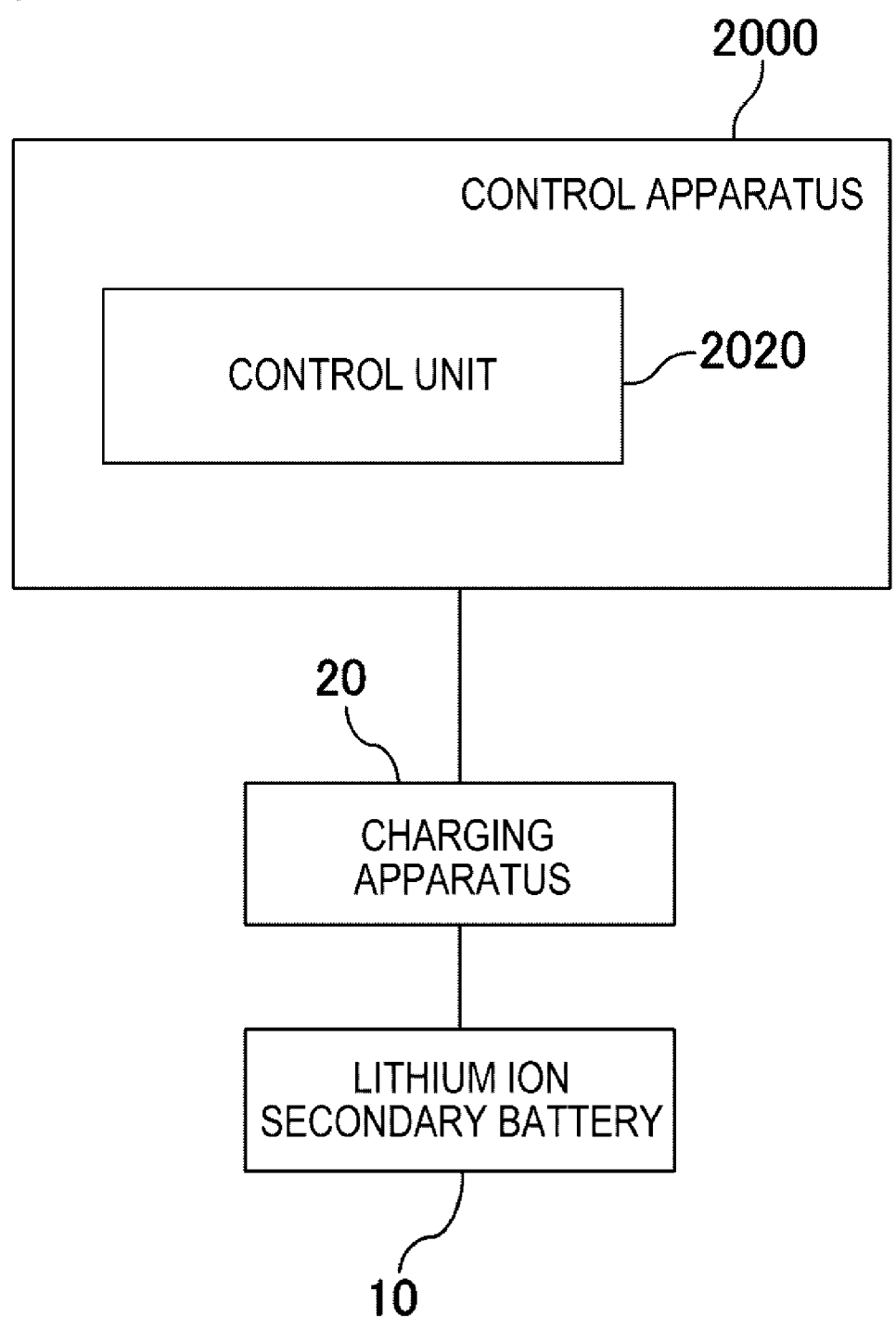
FIG. 1 is a block diagram illustrating a control apparatus according to Example Embodiment 1 along with a usage environment thereof.

FIG. 1 is a block diagram illustrating a control apparatus 2000 according to Example Embodiment 1 along with a usage environment thereof. A charging apparatus 20 is an apparatus that performs charging of a lithium ion secondary battery 10.

The control apparatus 2000 includes a control unit 2020. The control unit 2020 causes the charging apparatus 20 to charge the lithium ion secondary battery 10, by controlling the charging apparatus 20. At that time, the control unit 2020 controls the charging apparatus 20 as described below.

First, the control unit 2020 causes the charging apparatus 20 to charge the lithium ion secondary battery 10, until a voltage of the lithium ion secondary battery 10 becomes a predetermined voltage. Thereafter, the control unit 2020 causes the charging apparatus 20 to suspend the charging of the lithium ion secondary battery 10, until a predetermined time elapses. The control unit 2020 causes the charging apparatus 20 to further perform the charging of the lithium ion secondary battery 10, after the suspension.

FIG. 2 is a diagram illustrating a transition of the voltage, regarding the lithium ion secondary battery 10 charged by the charging apparatus 20 that is controlled by the control apparatus 2000. In FIG. 2, a voltage Va is the predetermined voltage described above. First, the control unit 2020 causes the charging apparatus 20 to perform the charging of the lithium ion secondary battery 10, until the voltage of the lithium ion secondary battery 10 becomes Va. As a result, the voltage of the lithium ion secondary battery 10 becomes Va at a time point Ta.

Thereafter, the control unit 2020 causes the charging of the lithium ion secondary battery 10 to be suspended, until a predetermined suspension time t elapses. Hereinafter, the time during which the charging of the lithium ion secondary battery 10 is suspended is referred to as suspension time.

The control unit 2020 causes the charging apparatus 20 to further perform the charging of the lithium ion secondary battery 10, from a time point Tb. The time point Tb is a point of time at which the suspension time t elapses from the time point Ta.

Here, the suspension time t satisfies a condition of Expression (3) below. Note that, a computation process of a parameter will be described later.

Expression 3

$$t \geq -A + B^{*}x + C^{*}y \quad 50 \leq A \leq 70, 500 \leq B \leq 620, 30 \leq C \leq 36 \qquad (3)$$

x represents weight per unit area of a negative electrode of the lithium ion secondary battery 10. The unit thereof is $g/cm^2$. y is density of the negative electrode. The unit thereof is $g/cm^3$. The unit of t is minute. A, B, and C are respectively constants.

Note that, in a case where a value which is computed on a right side of Expression (3) is equal to or less than 1 minute, the suspension time t may be set as 0. In other words, in this case, the control apparatus 2000 may cause the charging of the lithium ion secondary battery 10 not to be suspended.

<Advantageous Effect>

The present inventors found out that lithium deposits on a surface of the negative electrode of the lithium ion secondary battery 10 during the charging of the lithium ion secondary battery 10. For example, a cause of this phenomenon is considered as follows.

Figure 3A:
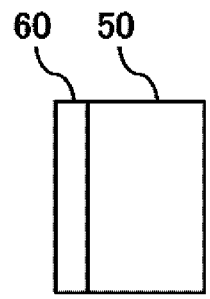
FIGS. 3A-3C are diagrams illustrating a state of a negative electrode of the lithium ion secondary battery at the time of charging the lithium ion secondary battery.
Figure 3B:
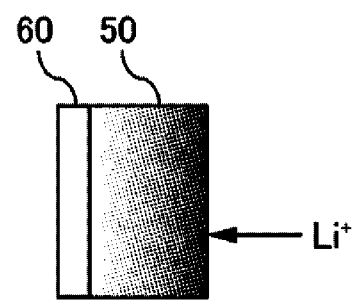
Figure 3C:
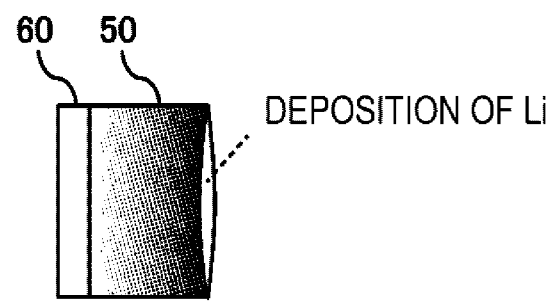

FIGS. 3A-3C are diagram illustrating a state of the negative electrode of the lithium ion secondary battery 10 at the time of charging the lithium ion secondary battery 10. FIG. 3A illustrates the state of the negative electrode of the lithium ion secondary battery 10 before a start of the charging. For example, the negative electrode of the lithium ion secondary battery 10 is configured by combining an active material 50 with a current collector 60. For example, a main component of the active material 50 is graphite.

By performing the charging of the lithium ion secondary battery 10, lithium ions which are included in an electrolyte are incorporated into the active material 50. At this time, unevenness occurs in distribution of the lithium ions in the active material 50. Specifically, the lithium ions in the active material 50 are largely distributed in a position which is close to the electrolyte. FIG. 3B illustrates the state of the negative electrode of the lithium ion secondary battery 10 after the start of the charging.

As a result of the occurrence of the uneven distribution of the lithium ions in this manner, it is difficult that the lithium ions are incorporated into the active material 50. Therefore, lithium deposits on the surface of the active material 50. FIG. 3C illustrates the state in which lithium deposits on the surface of the active material 50.

After the lithium ion secondary battery 10 is charged up to a predetermined voltage, the control apparatus 2000 of the present example embodiment suspends the charging for a predetermined time. At the time of a start of the suspension, the lithium ions which are incorporated into the active material 50 are unevenly distributed in the active material 50, as the lithium ion secondary battery 10 is charged up to the predetermined voltage (FIG. 3B). However, by suspending the charging of the lithium ion secondary battery 10 for the predetermined time, the lithium ions are dispersed in the active material 50 in the meanwhile. Accordingly, even if the charging of the lithium ion secondary battery 10 is further performed after the suspension, the deposition of lithium due to the unevenness of the distribution of the lithium ions is less likely to be caused.

In this manner, according to the control apparatus 2000 of the present example embodiment, it is possible to charge the lithium ion secondary battery 10, while preventing the deposition of lithium from the negative electrode of the lithium ion secondary battery 10.

Here, there are various problems in the deposition of lithium on the surface of the negative electrode. Firstly, since the lithium ions that are capable of being supplied from a positive electrode are reduced, a battery capacity of the lithium ion secondary battery 10 is reduced. Secondly, since activity of lithium is high, deposited lithium reacts with an electrolytic solution, and a gas is generated on an inside of the lithium ion secondary battery 10. Thirdly, the surface of the active material 50 is covered with precipitated lithium, thereby, internal resistance of the lithium ion secondary battery 10 is increased. Fourthly, a lithium dendrite grows to cause an internal short circuit, and self-discharging failure or abnormal heat generation is caused in the lithium ion secondary battery 10. The lithium deposition on the negative electrode is prevented by the control apparatus 2000 of the present example embodiment, thereby, it is possible to prevent the problems from being generated.

Note that, higher the density of the negative electrode is, more likely the lithium deposition on the negative electrode is to be caused. If the density of the negative electrode is high, the number of vacancies (electrolyte which is present in the negative electrode) in the negative electrode is small. Thus, the unevenness of the lithium ions is likely to be caused in the negative electrode.

As a method for reducing the deposition of lithium on the negative electrode, a method using the negative electrode with lower density is considered. However, if the density of the negative electrode is lowered, volume energy density of the lithium ion secondary battery 10 is lowered.

On the contrary, according to the control apparatus 2000 of the present example embodiment, it is possible to prevent the deposition of lithium on the negative electrode, without lowering the density of the negative electrode. Accordingly, it is possible to raise the volume energy density of the lithium ion secondary battery 10.

Hereinafter, the present example embodiment will be further described in detail.

<Hardware Configuration Example of Control Apparatus 2000>

Each functional configuration unit of the control apparatus 2000 may be realized by hardware (example: hard-wired electronic circuit or the like) that realizes each functional configuration unit, or may be realized by a combination (example: combination of an electronic circuit with a program for controlling the same, or the like) of hardware with software. Hereinafter, a case where each functional configuration unit of the control apparatus 2000 is realized by the combination of the hardware with the software will be further described.

Figure 4:
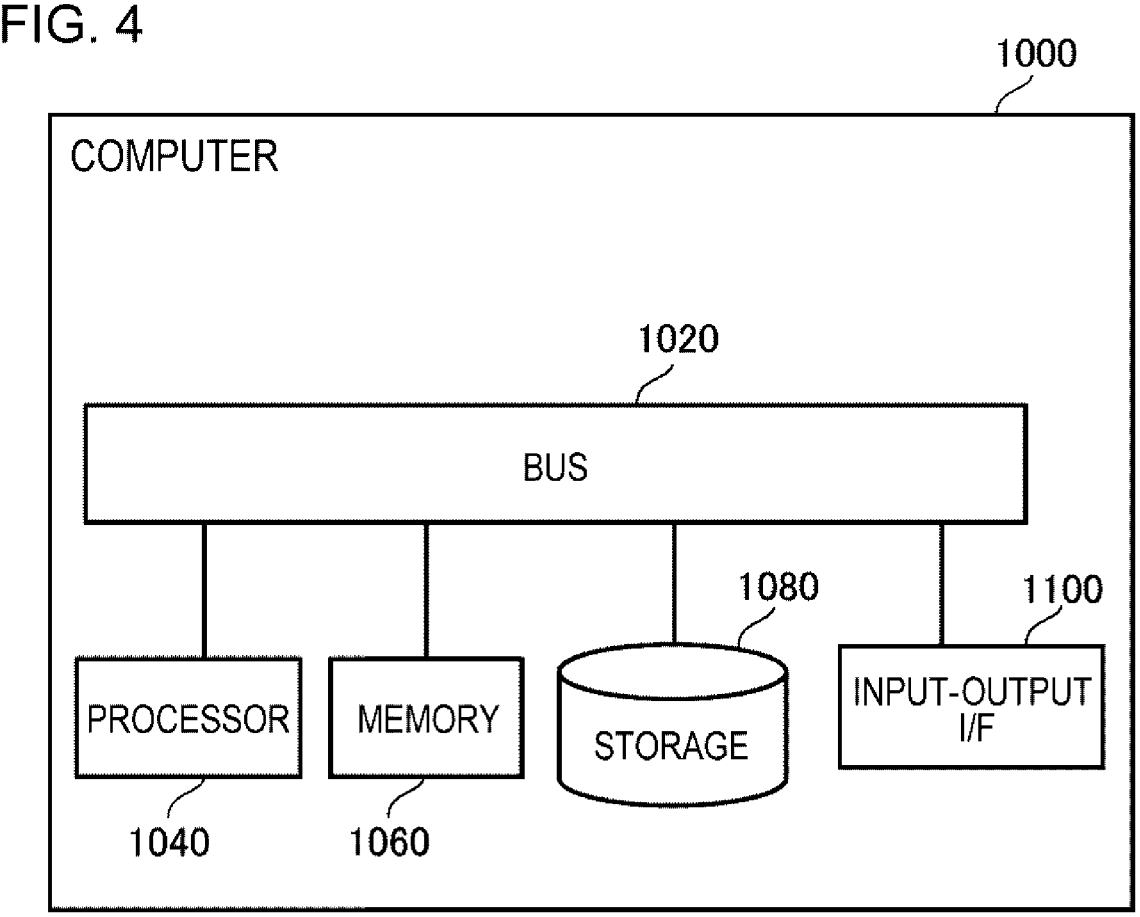
FIG. 4 is a diagram illustrating a computer for realizing the control apparatus.

FIG. 4 is a diagram illustrating a computer 1000 for realizing the control apparatus 2000. The computer 1000 is any computer. For example, the computer 1000 is a micro control unit (MCU), a personal computer (PC), a server machine, or the like. The computer 1000 may be an exclusive-use computer that is designed in order to realize the control apparatus 2000, or may be a general-purpose computer.

The computer 1000 includes a bus 1020, a processor 1040, a memory 1060, a storage device 1080, and an input-output interface 1100. The bus 1020 is a data transmission channel for sending and receiving data to each other in the processor 1040, the memory 1060, the storage device 1080, and the input-output interface 1100. However, a method of connecting the processors 1040 and the like to each other is not limited to the bus connection. The processor 1040 is an arithmetic processing apparatus such as a microprocessor or a central processing unit (CPU). The memory 1060 is a memory such as a random access memory (RAM). The storage device 1080 is a storing apparatus such as a read only memory (ROM), a flash memory, or a hard disk. The input-output interface 1100 is an interface for connecting the computer 1000 to an input-output device.

<Flow of Processing>

Figure 5:
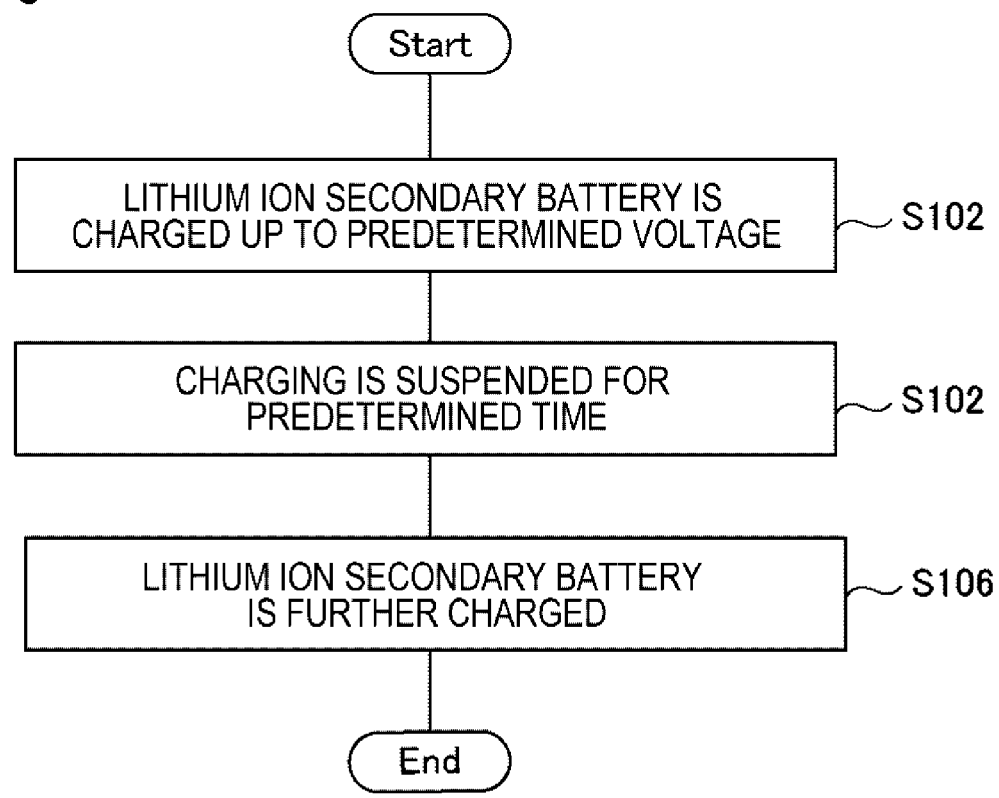
FIG. 5 is a flowchart illustrating a flow of processing that is executed by the control apparatus according to Example Embodiment 1.

FIG. 5 is a flowchart illustrating a flow of processing that is executed by the control apparatus 2000 according to Example Embodiment 1. The control unit 2020 controls the charging apparatus 20, and causes the lithium ion secondary battery 10 to be charged up to the predetermined voltage (S102). The control unit 2020 controls the charging apparatus 20, and causes the charging of the lithium ion secondary battery 10 to be suspended for the predetermined time (S104). After S104, the control unit 2020 controls the charging apparatus 20, and causes the lithium ion secondary battery 10 to be further charged (S106).

<Usage Environment of Control Apparatus 2000>

Figure 6:
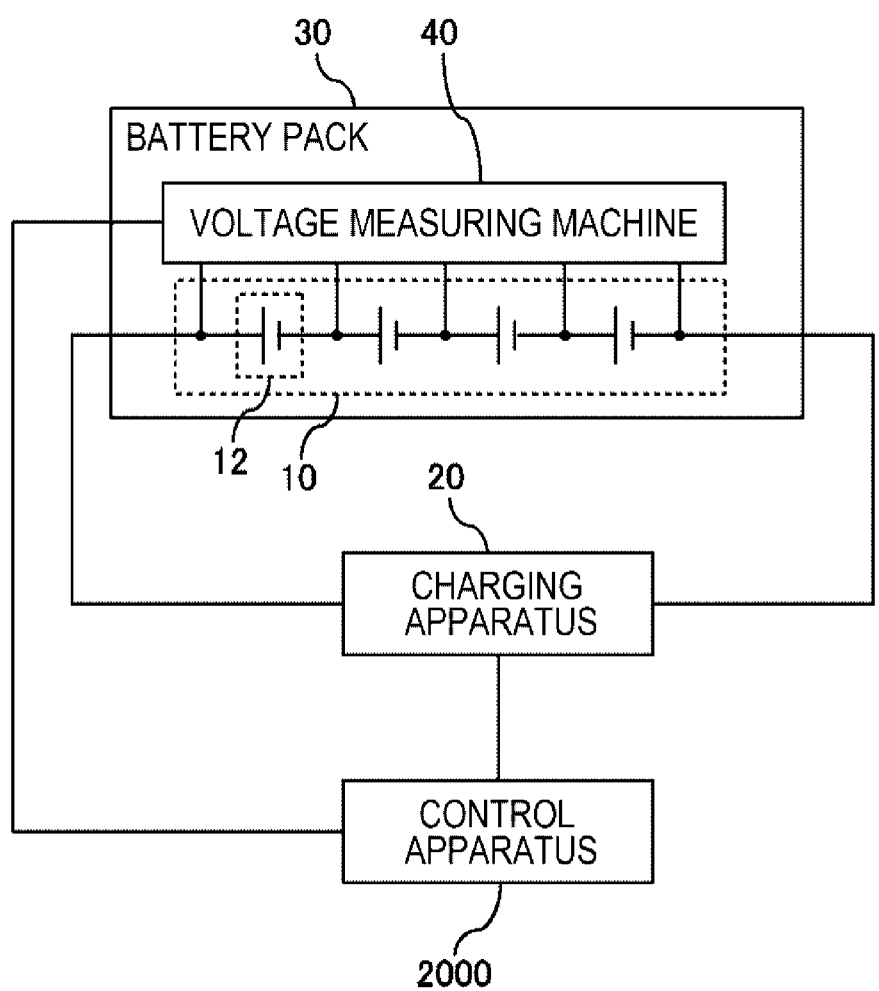
FIG. 6 is a diagram illustrating a realization example of the control apparatus.

FIG. 6 is a diagram further specifically illustrating a usage environment of the control apparatus 2000. In FIG. 6, the lithium ion secondary battery 10 is configured as an assembled battery in which a plurality of unit battery cells 12 are connected in series. The charging apparatus 20 is connected to the lithium ion secondary battery 10.

The lithium ion secondary battery 10 is included in a battery pack 30. Furthermore, the battery pack 30 includes a voltage measuring machine 40 that measures the voltage of the lithium ion secondary battery 10.

The control apparatus 2000 is connected to the voltage measuring machine 40 which is included in the battery pack 30. The control apparatus 2000 repeatedly obtains the voltage of the lithium ion secondary battery 10, from the voltage measuring machine 40. By doing so, it is recognized that the voltage of the lithium ion secondary battery 10 becomes the predetermined voltage by the control apparatus 2000. Furthermore, the control apparatus 2000 is connected to the charging apparatus 20.

Note that, the usage environment of the control apparatus 2000 is not limited to an example illustrated in FIG. 5. For example, the control apparatus 2000 may be provided on the inside of the charging apparatus 20. Moreover, there is no need the lithium ion secondary battery 10 is necessarily configured as an assembled battery.

<Regarding Lithium Ion Secondary Battery 10>

The components of a positive electrode terminal and a negative electrode terminal of the lithium ion secondary battery 10 are optional. For example, the positive electrode terminal of the lithium ion secondary battery 10 is a terminal using a nickel-based positive electrode material as an active material. On the other hand, for example, the negative electrode terminal of the lithium ion secondary battery 10 is a terminal using a material whose main component is graphite as an active material.

<Method for Computing Parameter>

As described above, the suspension time t representing a length of the suspension time is represented by Expression (3). Hereinafter, a method for introducing a range of each parameter A to C in Expression (3) will be described.

The range of a value of each parameter described above is introduced by a test described below. In the test, the battery cells of a plurality of patterns whose the weight per unit area of the negative electrode and the density of the negative electrode are different from each other are used. There are three patterns regarding the weight per unit area of the negative electrode: 0.024, 0.021, and 0.018 g/cm. There are four pattern regarding the density of the negative electrode: 1.55, 1.50, 1.46, and 1.40 g/cm³.

Regarding each battery cell, constant current and constant voltage charging (CCCV charging) is performed at a charging rate of 1 C, until a charging voltage becomes 4.15 V from a discharging state. At that time, the charging is suspended for the predetermined time, in each of a time point at which the charging voltage is 4.0 V and a time point at which the charging voltage is 4.1 V. Here, the test is performed onto each of cases where the suspension time are 1 minute, 3 minutes, and 5 minutes. The test is performed onto a case where the suspension is not performed as well.

Furthermore, after the cell after the charging is discharged (0.2 C, 2.5 V), the cell is disassembled, and the surface of the negative electrode is visually observed. In a case where deposition with white color is perceived on the surface of the negative electrode, it is determined that lithium had deposited. On the other hand, in a case where the deposition with of white color is not perceived on the surface of the negative electrode, it is determined that lithium had not deposited (the lithium deposition is prevented).

Table 1 to Table 3 hereinafter are tables illustrating test results.

TABLE 1

| Suspension time | density of negative electrode | | | |
|---|---|---|---|---|
| | 1.55 | 1.5 | 1.46 | 1.4 |
| 0 | | | x | o |
| 1 | | x | o | |
| 3 | x | o | | |
| 5 | o | | | |
| 10 | | | | |

Table 1 illustrates a test result of a case where the weight per unit area of the negative electrode is 0.024 g/cm.

TABLE 2

| Suspension time | density of negative electrode | | | |
|---|---|---|---|---|
| | 1.55 | 1.5 | 1.46 | 1.4 |
| 0 | | x | o | o |
| 1 | x | o | | |
| 3 | o | | | |
| 5 | | | | |
| 10 | | | | |

Table 2 illustrates a test result of a case where the weight per unit area of the negative electrode is 0.021 g/cm.

TABLE 3

| Suspension time | density of negative electrode | | | |
|---|---|---|---|---|
| | 1.55 | 1.5 | 1.46 | 1.4 |
| 0 | x | o | o | o |
| 1 | o | | | |
| 3 | | | | |
| 5 | | | | |
| 10 | | | | |

Table 3 illustrates a test result of a case where the weight per unit area of the negative electrode is 0.018 g/cm².

From the results described above, it is understood that lithium is likely to deposit on the negative electrode as the weight per unit area of the negative electrode is large, and lithium is likely to deposit on the negative electrode as the density of the negative electrode is high.

Based on Table 1 to Table 3 described above, the suspension times which are necessary in order to prevent the lithium deposition are summarized. A result thereof is illustrated in Table 4 below.

TABLE 4

| No. | Weight per unit area of negative electrode | Density of negative electrode | Suspension time |
|---|---|---|---|
| 1 | 0.024 | 1.55 | 5 |
| 2 | 0.024 | 1.5 | 3 |
| 3 | 0.024 | 1.46 | 1 |
| 4 | 0.024 | 1.4 | 0 |
| 5 | 0.021 | 1.55 | 3 |
| 6 | 0.021 | 1.5 | 1 |
| 7 | 0.021 | 1.46 | 0 |
| 8 | 0.021 | 1.4 | 0 |
| 9 | 0.018 | 1.55 | 1 |
| 10 | 0.018 | 1.5 | 0 |
| 11 | 0.018 | 1.46 | 0 |
| 12 | 0.018 | 1.4 | 0 |

The range of the value of each parameter of Expression (3) which is a computation expression of the suspension time t is computed by performing a regression analysis using the data illustrated in Table 4. Note that, in order to raise accuracy of the regression analysis, No. 8, No. 11, and No. 12 in Table 4 are excluded from a target of the regression analysis.

Table 5 below illustrates a result of the regression analysis.

TABLE 5

|  | Coefficient | Standard error |
|---|---|---|
| Piece | −59.89 | 5.27 |
| Weight per unit area of negative electrode | 557.2 | 62.3 |
| Density of negative electrode | 32.98 | 3.07 |

From Table 5, setting the parameters A, B, and C of Expression (3) as 60, 557, and 33, respectively is introduced as preferable. Furthermore, based on a standard error illustrated in Table 5, the range of each parameter is determined as illustrated in Expression (3).

Note that, from the standard error illustrated in Table 5, it is further suitable that an upper limit value of the range of A, an upper limit value of the range of B, and an upper limit value of the range of C are 65, 590, and 34, respectively. From the standard error illustrated in Table 5, it is further suitable that a lower limit value of the range of A, a lower limit value of the range of B, and a lower limit value of the range of C are 55, 530, and 32, respectively.

<Regarding Predetermined Voltage>

As described above, the control unit 2020 causes the charging apparatus 20 to perform the charging of the lithium ion secondary battery 10, until the voltage of the lithium ion secondary battery 10 becomes the predetermined voltage (S102). It is suitable that the predetermined voltage is a voltage with which a state of charge (SOC) of the lithium ion secondary battery 10 is equal to or more than 70% and equal to or less than 100% in a case where the lithium ion secondary battery 10 is charged at the charging rate of 0.2 C.

Note that, if the SOC of the lithium ion secondary battery 10 is too low at the time of the start of the suspension, an effect of suspending the charging becomes small. It is more suitable that the lower limit value of the range of the predetermined voltage is 75% of the SOC of the lithium ion secondary battery 10 by the charging described above. The further suitable lower limit value is 80% of the SOC of the lithium ion secondary battery 10 by the same charging.

If the SOC of the lithium ion secondary battery 10 is too high at the start of the suspension, a probability of the deposition of lithium becomes high. It is more suitable that the upper limit value of the range of the predetermined voltage is 95% of the SOC of the lithium ion secondary battery 10 by the same charging. The further suitable upper limit value is 90% of the SOC of the lithium ion secondary battery 10 by the same charging.

<Regarding Computation of Suspension Time>

The suspension time t that is the time during which the charging of the lithium ion secondary battery 10 is suspended is computed in advance before the suspension of the charging of the lithium ion secondary battery 10 is started. For example, the control apparatus 2000 receives inputs of the weight per unit area x of the negative electrode of the lithium ion secondary battery 10 and the density y of the negative electrode from the user. The user inputs the value described above, using any input device (for example, a keyboard). The control apparatus 2000 computes the input value by the computation expression on the right side of Expression (3), and sets a computation result thereof as suspension time t. Note that, the range of each parameter of Expression (3) is set in advance to one value which is included in the range described above. For example, the computed suspension time t is stored in the storing apparatus (for example, the storage device 1080 of FIG. 4) which is accessible from the control unit 2020.

Note that, the control apparatus 2000 may set a value that is larger than the value which is obtained on the right side of Expression (3) as suspension time t. In this case, for example, the control apparatus 2000 sets a value obtained by adding a predetermined value to the obtained value as suspension time t. The predetermined value thereof may be specified by a user, may be set in advance in the control apparatus 2000, or may be stored in the storing apparatus which is accessible from the control apparatus 2000.

<Plurality of Times of Suspensions>

The control unit 2020 may cause the charging apparatus 20 to perform suspensions of the charging a plurality of times. At this time, timing of performing a first suspension is timing at which the voltage of the lithium ion secondary battery 10 becomes equal to or more than the predetermined voltage. A second suspension and subsequent suspensions may be started any timing. The lengths of the second suspension and subsequent suspensions may be any length.

Example Embodiment 2

The control apparatus 2000 of the example embodiment is represented by, for example, FIG. 1, in the same manner as the control apparatus 2000 of Example Embodiment 1. Except for points described below, the control apparatus 2000 of Example Embodiment 2 has functions which are the same as those of the control apparatus 2000 of Example Embodiment 1.

In the control apparatus 2000 of Example Embodiment 2, the predetermined suspension time t during which the charging of the lithium ion secondary battery 10 is suspended is set as "length that is equal to or more than time from a time point at which the voltage of the lithium ion secondary battery 10 becomes the predetermined voltage described above to a time point at which a temporal change ratio of the voltage of the lithium ion secondary battery 10 becomes a local minimum value". To do so, test measurement for determining the suspension time t is performed, in advance before the control apparatus 2000 is used.

Specifically, the suspension time t is determined as follows. First, after the lithium ion secondary battery 10 is charged up to the predetermined voltage described above, a temporal change of the voltage of the lithium ion secondary battery 10 is measured. Furthermore, from a measurement result thereof, a time point at which the temporal change ratio of the voltage of the lithium ion secondary battery 10 becomes the local minimum value is computed. Therefore, the value of the suspension time t is set to a value which is equal to or more than the computed time.

Figure 7A:
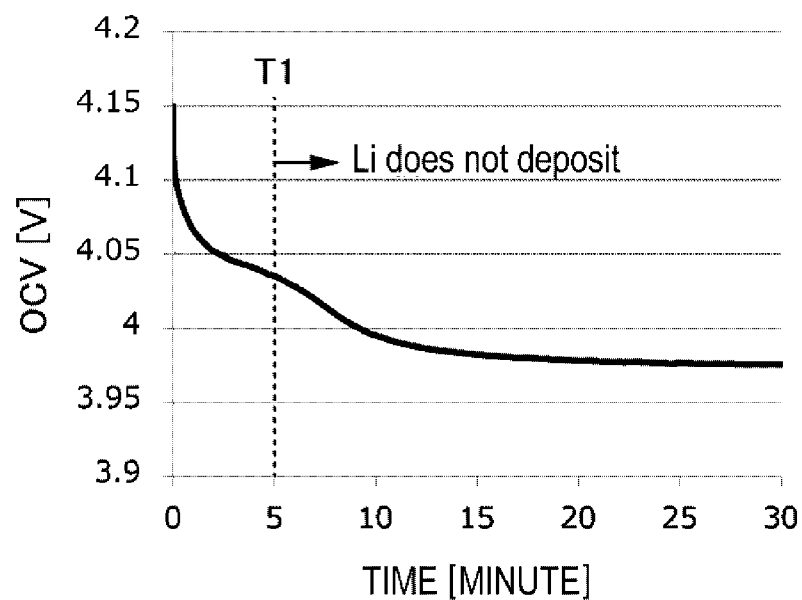
FIGS. 7A and 7B are diagrams illustrating a transition of an OCV of the lithium ion secondary battery.
Figure 7B:
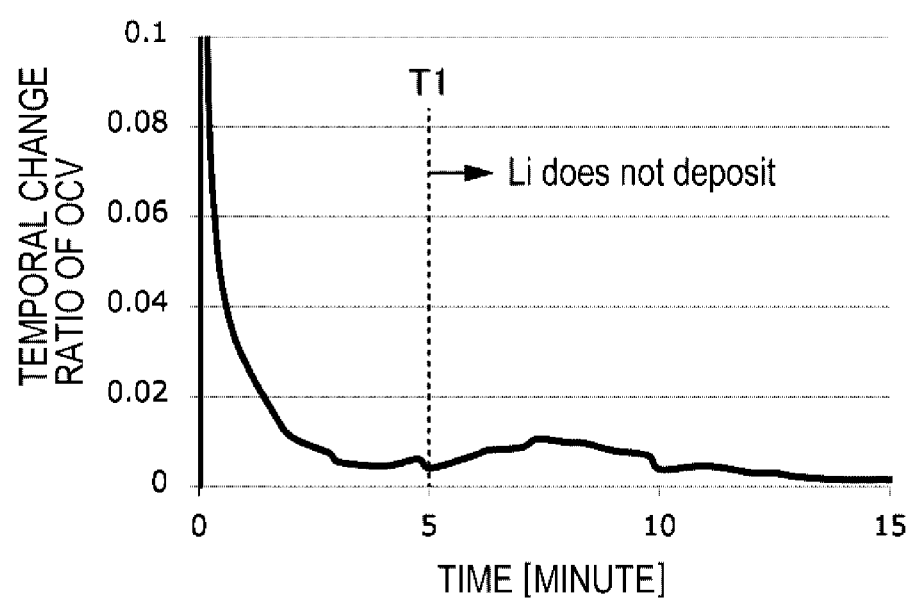

FIG. 7 are diagrams illustrating a transition of an OCV of the lithium ion secondary battery 10. In the example, until the charging voltage becomes 4.15 V (SOC=88%), after constant current charging (CC charging) of the lithium ion secondary battery 10 is performed at the charging rate of 1 C, the OCV of the lithium ion secondary battery 10 is measured. FIG. 7A illustrates the temporal change of the OCV. On the other hand, FIG. 7B represents the temporal change ratio (graph obtained by differentiating a graph of FIG. 7A) of the OCV.

As a result of the test, it is understood that lithium does not deposits on the negative electrode of the lithium ion secondary battery 10, even if the charging of the lithium ion secondary battery 10 is further performed after a time point T1. The time point T1 is a time point at which a shoulder is viewed in the graph of FIG. 7A. In other words, the time point T1 is a time point at which the graph of FIG. 7B becomes the local minimum value.

The change in the OCV of the lithium ion secondary battery 10 illustrates that the distribution of the lithium ions in the lithium ion secondary battery 10 is changed. The change in the distribution of the lithium ions is derived from any of the negative electrode, the positive electrode, and the electrolytic solution. The shoulder which is viewed at the time point T1 in FIGS. 7A and 7B illustrates that the distribution of the lithium ions in the negative electrode is made substantially even, and it is considered that the lithium deposition is prevented, by providing the suspension of time which is equal to or more than the time point T1. Note that, the change in the OCV after T1 is considered to be derived from the positive electrode side.

The control apparatus 2000 of the present example embodiment sets a termination time point of the suspension of the lithium ion secondary battery 10 as a time point after the time point at which the temporal change ratio of the voltage of the lithium ion secondary battery 10 becomes the local minimum value, after the suspension of the charging of the lithium ion secondary battery 10 is started. By doing so, the deposition of lithium on the negative electrode of the lithium ion secondary battery 10 is prevented.

Here, it is also considered that a plurality of time points at which the temporal change ratio of the voltage of the lithium ion secondary battery 10 becomes the local minimum value are present. In this case, it is possible to set the suspension time t to be after any time point in the plurality of time points. For example, the suspension time is set as the smallest time point in the plurality of time points, or a time point after the smallest time point.

<Hardware Configuration>

The control apparatus 2000 of Example Embodiment 2 is realized using the computer 1000 in the same manner as Example Embodiment 1 (see FIG. 4).

<Advantageous Effect>

According to the control apparatus 2000 of the present embodiment, an advantageous effect which is the same as that of the control apparatus 2000 of Example Embodiment 1 is obtained.

Hitherto, the example embodiments of the present invention are described with reference to the drawings, but are merely examples of the present invention, and it is possible to adopt various configurations other than the above description.

For example, it is possible to manually carry out a portion or all of the processing which is executed by the control apparatus 2000 in each example embodiment. In this case, it is made such that the start and the stop of the charging in the charging apparatus 20 are manually operable. Moreover, it is made such that a person can recognize that the voltage of the lithium ion secondary battery 10 becomes equal to or more than the predetermined voltage. For example, it is made such that the voltage of the lithium ion secondary battery 10 which is measured by a voltage measuring circuit is displayed on a display apparatus or the like. Hereinafter, the person who operates the charging apparatus 20 is referred to as an operator.

First, the operator operates the charging apparatus 20, and causes the charging apparatus 20 to charge the lithium ion secondary battery 10. At this time, for example, the operator monitors the voltage of the lithium ion secondary battery 10 which is displayed on the display apparatus. When the voltage of the lithium ion secondary battery 10 becomes equal to or more than the predetermined voltage, the operator operates the charging apparatus 20, and causes the charging of the lithium ion secondary battery 10 to be suspended.

Thereafter, when the suspension time elapses, the operator operates the charging apparatus 20, and causes the charging of the lithium ion secondary battery 10 to be restarted.

A portion or all of the example embodiments described above is described as the following additional remark, but is not limited thereto.

1. A control apparatus including:
   a control unit that controls a charging apparatus which performs charging of a lithium ion secondary battery,
   in which the control unit performs:
      causing the charging apparatus to perform the charging of the lithium ion secondary battery, until a voltage of the lithium ion secondary battery becomes a predetermined voltage,
      causing the charging apparatus to suspend the charging of the lithium ion secondary battery, until a predetermined time t elapses, after the charging, and
      causing the charging apparatus to further perform the charging of the lithium ion secondary battery, after the suspending, and
   the predetermined time t [minute] satisfies a condition that is determined by Expression (4) using weight per unit area x [g/cm$^2$] of a negative electrode of the lithium ion secondary battery and density y [g/cm$^3$] of the negative electrode.

Expression 4

$$t \geq -A + B^* x + C^* y \quad 50 \leq A \leq 70, 500 \leq B \leq 620, 30 \leq C \leq 36 \quad (4)$$

2. A control apparatus including:
   a control unit that controls a charging apparatus which performs charging of a lithium ion secondary battery,
   in which the control unit performs:
      causing the charging apparatus to perform the charging of the lithium ion secondary battery, until a voltage of the lithium ion secondary battery becomes a predetermined voltage,
      causes the charging apparatus to suspend the charging of the lithium ion secondary battery, until a predetermined time elapses, after the charging, and
      causing the charging apparatus to further perform the charging of the lithium ion secondary battery, after the suspending, and
   the predetermined time is a length that is equal to or more than time from a time point at which the suspending is started to a time point at which a temporal change ratio of the voltage of the lithium ion secondary battery becomes a local minimum value.

3. The control apparatus according to 1. or 2.,
   in which the predetermined voltage is a voltage in which a state of charge of the lithium ion secondary battery is equal to or more than 70% and equal to or less than 100% in a case where the lithium ion secondary battery is charged at a charging rate of 0.2 C.

4. A control method including:
   a step of causing a charging apparatus that performs charging of a lithium ion secondary battery to perform the charging of the lithium ion secondary battery, until a voltage of the lithium ion secondary battery becomes a predetermined voltage,
   a step of causing the charging apparatus to suspend the charging of the lithium ion secondary battery, until a predetermined time t elapses, after the charging, and a step of causing the charging apparatus to further perform the charging of the lithium ion secondary battery, after the suspending, in which the predetermined time t [minute] satisfies a condition that is determined by Expression (5) using weight per unit area x [g/cm$^2$] of a negative electrode of the lithium ion secondary battery and density y [g/cm$^3$] of the negative electrode.

Expression 5

$$t \geq A + B^*x + C^*y \quad 50 \leq A \leq 70, 500 \leq B \leq 620, 30 \leq C \leq 36 \quad (5)$$

5. A control method including:

a step of causing a charging apparatus that performs charging of a lithium ion secondary battery to perform the charging of the lithium ion secondary battery, until a voltage of the lithium ion secondary battery becomes a predetermined voltage, a step of causing the charging apparatus to suspend the charging of the lithium ion secondary battery, until a predetermined time t elapses, after the charging, and a step of causing the charging apparatus to further perform the charging of the lithium ion secondary battery, after the suspending, in which the predetermined time is a length that is equal to or more than time from a time point at which the suspending is started to a time point at which a temporal change ratio of the voltage of the lithium ion secondary battery becomes a minimum value.

6. The control method according to 4. or 5., in which the predetermined voltage is a voltage in which a state of charge of the lithium ion secondary battery is equal to or more than 70% and equal to or less than 100% in a case where the lithium ion secondary battery is charged at a charging rate of 0.2 C.

7. A program causing a computer to execute each step of the control method according to any one of 4. to 6.

The invention claimed is:

1. A control apparatus comprising:
   a control unit that controls a charging apparatus which performs charging of a lithium ion secondary battery, wherein the control unit performs:
      causing the charging apparatus to perform the charging of the lithium ion secondary battery, until a voltage of the lithium ion secondary battery becomes a predetermined voltage;
      causing the charging apparatus to suspend the charging of the lithium ion secondary battery, until a predetermined time t elapses, after the charging; and
      causing the charging apparatus to further perform the charging of the lithium ion secondary battery, after the suspending, and the predetermined time t [minute] satisfies a condition that is determined by Expression (1) using weight per unit area x [g/cm2] of a negative electrode of the lithium ion secondary battery and density y [g/cm3] of the negative electrode Expression 1

$$t \geq -A + B^*x + C^*y \quad 50 \leq A \leq 70, 500 \leq B \leq 620, 30 \leq C \leq 36 \quad (1).$$

2. The control apparatus according to claim 1, wherein the predetermined voltage is a voltage in which a state of charge of the lithium ion secondary battery is equal to or more than 70% and equal to or less than 100% in a case where the lithium ion secondary battery is charged at a charging rate of 0.2 C.

3. A control method comprising:
   causing a charging apparatus that performs charging of a lithium ion secondary battery to perform the charging of the lithium ion secondary battery, until a voltage of the lithium ion secondary battery becomes a predetermined voltage;
   causing the charging apparatus to suspend the charging of the lithium ion secondary battery, until a predetermined time t elapses, after the charging; and
   causing the charging apparatus to further perform the charging of the lithium ion secondary battery, after the suspending, wherein the predetermined time t [minute] satisfies a condition that is determined by Expression (2) using weight per unit area x [g/cm2] of a negative electrode of the lithium ion secondary battery and density y [g/cm3] of the negative electrode Expression 2

$$t \geq -A + B^*x + C^*y \quad 50 \leq A \leq 70, 500 \leq B \leq 620, 30 \leq C \leq 36 \quad (2).$$

4. The control method according to claim 3, wherein the predetermined voltage is a voltage in which a state of charge of the lithium ion secondary battery is equal to or more than 70% and equal to or less than 100% in a case where the lithium ion secondary battery is charged at a charging rate of 0.2 C.

5. A non-transitory computer-readable storage medium storing a program causing a computer to execute each step of the control method according to claim 3.

* * * * *